United States Patent
Knudsen

(10) Patent No.: US 7,685,438 B2
(45) Date of Patent: *Mar. 23, 2010

(54) TAMPER-RESISTANT PACKAGING AND APPROACH USING MAGNETICALLY-SET DATA

(75) Inventor: Carl J. Knudsen, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 821 days.

This patent is subject to a terminal disclaimer.

(21) Appl. No.: 10/541,884

(22) PCT Filed: Jan. 14, 2004

(86) PCT No.: PCT/IB2004/000049

§ 371 (c)(1),
(2), (4) Date: Oct. 23, 2006

(87) PCT Pub. No.: WO2004/064071

PCT Pub. Date: Jul. 29, 2004

(65) Prior Publication Data

US 2007/0139989 A1 Jun. 21, 2007

Related U.S. Application Data

(60) Provisional application No. 60/439,986, filed on Jan. 14, 2003.

(51) Int. Cl.
*G06F 11/30* (2006.01)

(52) U.S. Cl. .................. 713/194; 206/719; 206/701; 206/807; 726/34; 365/48; 365/55

(58) Field of Classification Search .............. 206/719
See application file for complete search history.

(56) References Cited

U.S. PATENT DOCUMENTS

| | | | | |
|---|---|---|---|---|
| 6,477,335 | B1 * | 11/2002 | Surya et al. | 399/12 |
| 7,005,733 | B2 * | 2/2006 | Kommerling et al. | 257/679 |
| 7,054,162 | B2 * | 5/2006 | Benson et al. | 361/760 |
| 7,299,358 | B2 * | 11/2007 | Chateau et al. | 713/176 |
| 7,343,496 | B1 * | 3/2008 | Hsiang et al. | 713/194 |

FOREIGN PATENT DOCUMENTS

JP 3084959 A * 4/1991

OTHER PUBLICATIONS

English Language Abstract for JP 3084959 A.*

* cited by examiner

*Primary Examiner*—Kaveh Abrishamkar

(57) ABSTRACT

A tamper-resistant packaging approach protects an integrated circuit (100) from undesirable access. According to an example embodiment of the present invention, data is encrypted as a function of the state of a plurality of magnetically-responsive circuit elements (130-135) and then decrypted as a function of the state (130-135). A package (106) is arranged to prevent access to the integrated circuit and having magnetic particles (120-125) therein. The magnetic particles (120-125) are arranged to cause the magnetically-responsive circuit elements (130-135) to take on a state that is used to encrypt the data. The state of these elements is again accordingly used to decrypt the data (e.g., as a key). When the magnetic particles are altered, for example, by removing a portion of the package, the state of one or more of the magnetically-responsive circuit elements is changed, thus rendering the state incapable of being used for decrypting the data.

16 Claims, 2 Drawing Sheets

TAMPER-RESISTANT PACKAGING AND APPROACH USING MAGNETICALLY-SET DATA

CROSS REFERENCE TO RELATED APPLICATION

Figure 1:
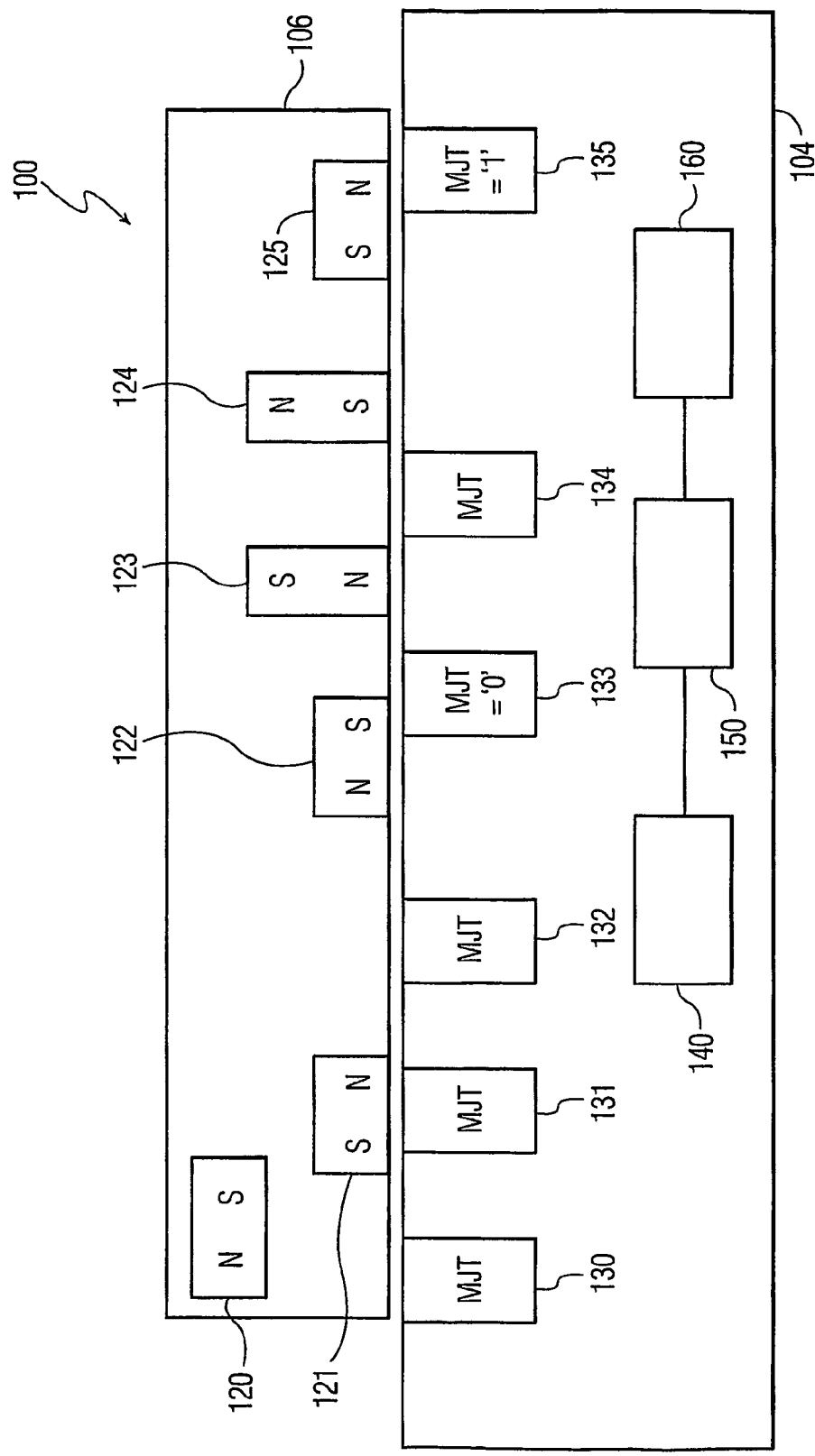

This application claims the benefit of U.S. provisional application Ser. No. 60/439,986 filed 14 Jan. 2003, which is incorporated herein by reference.

The present invention is directed to device packaging and, more particularly, to tamper-resistant packaging for items such as integrated circuits.

Packaging plays an important role in product protection and security. For instance, in electronics and software applications, packaging is important for ensuring that products are kept free from damage and are not tampered with. Tamper-prevention has been particularly important in applications where information stored within a particular package is proprietary. For example, in memory and other data-storage applications, it is sometimes desirable to prevent access to circuits used to store data, as well as to protect the data that is stored.

A variety of approaches to protecting data have been previously used. For example, in SRAM applications, memory is lost when power is removed from the circuitry used to store data. In this regard, power can be removed when tampering is detected to erase stored data. When these approaches involve battery backup, the battery power is also removed in response to tampering.

In other memory applications, power is not necessarily required for storing data. For example, in magnetic memory applications, memory is stored in a manner that does not require power to maintain the memory and thus is non-volatile. Certain types of magnetic memory cells that use the magnetic state of a region for altering the electrical resistance of materials located near the region are collectively known as magnetoresistive (MR) memory cells. An array of magnetic memory cells is often called a magnetic random access memory (MRAM). In MRAM applications, memory cells are typically formed on intersections of word lines and sense lines, with each memory cell typically having magnetic layers separated by a conductive or insulating layer. Magnetoresistive metals used in such memory applications show a change in electrical resistance when placed in a magnetic field. In this regard, the MRAM cell has two stable magnetic configurations, one having high resistance and the other low resistance (e.g., with high resistance representing a logic state zero and low resistance representing a logic state one). The magnetic state (i.e., magnetic charge) of the device is manipulated and read as data, such that the read can be effected using an instrument to probe an integrated circuit on which the MRAM cell is located.

Protecting memory in applications relying on power to maintain memory, as well as those applications that do not necessarily require power to maintain memory (i.e., non-volatile memory), has been challenging. In particular, protecting non-volatile memory has been challenging because typical approaches involving power-related tamper protection do not work. Specifically, removing power does not cause memory loss. These and other difficulties present challenges to the implementation of tamper-protection and packaging for a variety of applications.

Various aspects of the present invention involve tamper protection for a variety of integrated circuits, such as memory. The present invention is exemplified in a number of implementations and applications, some of which are summarized below.

According to one example embodiment, the present invention is directed to an integrated circuit chip arrangement including a chip package that has magnetic material over at least a portion of circuitry in the chip. The chip circuitry includes magnetically-responsive nodes adapted to store bits; these nodes are responsive to the magnetic material over the chip circuitry. A circuit (e.g., cryptographic) is adapted to store selected bits of the plurality of magnetically-responsive nodes, the value of the bits being responsive to the magnetic material in the package. The orientation of these bits can be used to define an enable state for the chip. Should tampering occur (e.g., removing a portion of the package), the magnetic field provided by the magnetic material over the chip circuitry will likely change. In turn, the circuit stores different bits from the states of the magnetically-responsive nodes; in turn, the enable state for the chip is removed.

In a more particular example embodiment of the present invention, a set of the magnetically-responsive nodes is tested for stability and selected for use as an enable key. The identity (e.g., location) of these nodes is stored in an enable register, and an output from these selected nodes is used to encrypt data. Upon subsequent power-up, data from the enable register is used to mask data read from the magnetically-responsive nodes, such that those nodes matching the identity The above summary of the present invention is not intended to describe each embodiment or every implementation of the present invention. The above summary of the present invention is not intended to describe each illustrated embodiment or every implementation of the present invention. The figures and detailed description that follow more particularly exemplify these embodiments.

Figure 2:
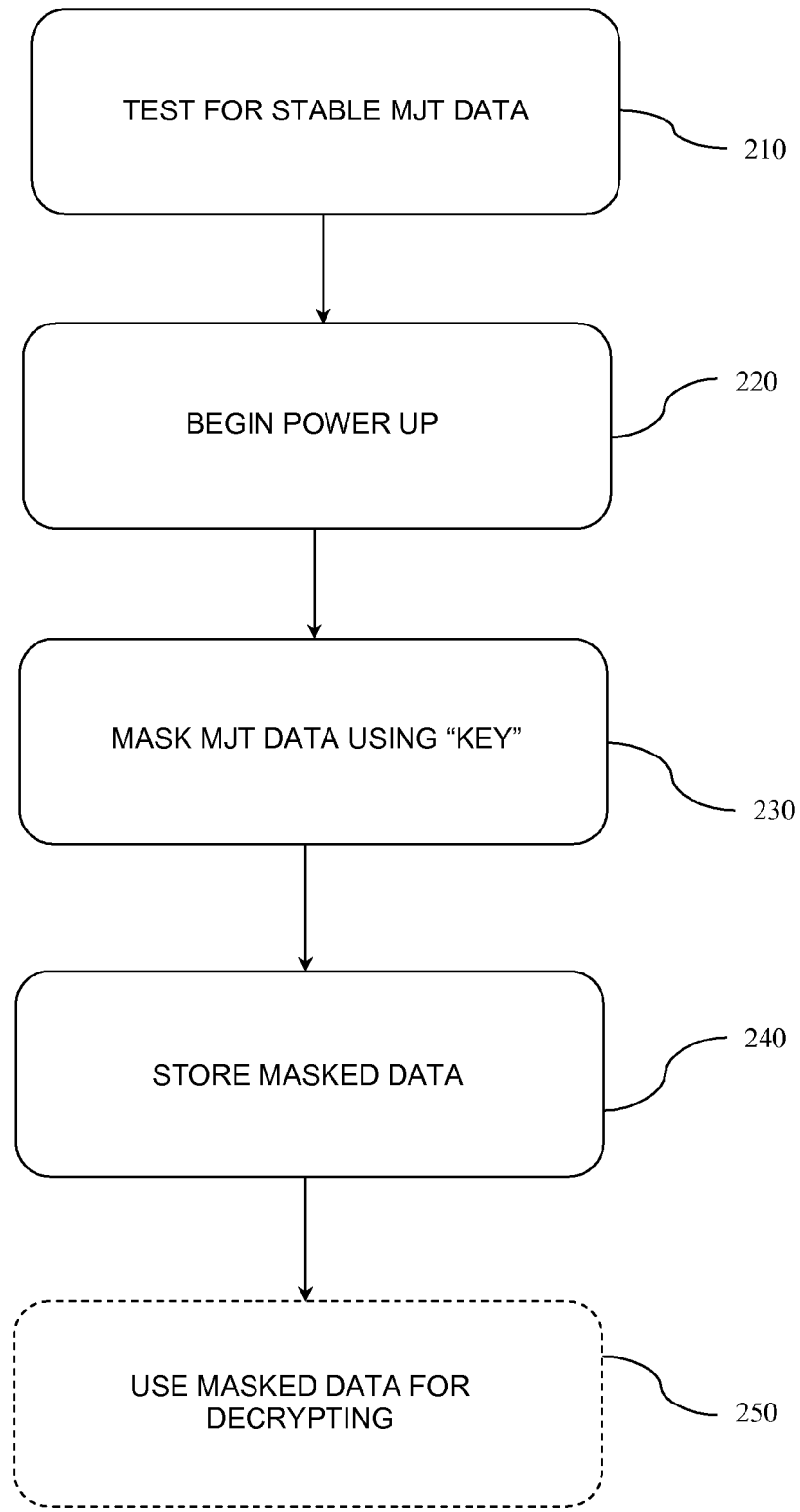

The invention may be more completely understood in consideration of the following detailed description of various embodiments of the invention in connection with the accompanying drawings, in which:

FIG. 1 is an integrated circuit arrangement adapted for inhibiting tampering therewith, according to an example embodiment of the present invention; and FIG. 2 is a flow diagram for a tamper-protection approach, according to another example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of circuits and approaches involving and/or benefiting from tamper protection, and in particular to the detection of tampering of a packaged integrated circuit without necessarily relying upon power or interruption and/or the detection of an electrical characteristic. While the present invention is not necessarily limited to such applications, an appreciation of various aspects of the invention is best gained through a discussion of examples in such an environment.

According to an example embodiment of the present invention, a cryptographic key is programmed into an integrated circuit device using a plurality of magnetically-responsive circuit elements and a package having magnetic elements therein. The magnetic elements in the package are arranged to generate a magnetic field that causes at least some of the magnetically-responsive circuit elements to take on a magnetic state. The state of the magnetically-responsive circuit elements is used as a magnetically-stored bit that is removed (e.g., erased) when the magnetic elements in the package are removed. The magnetically-stored bits are used to form a cryptographic key that is stored in a register in the integrated circuit, with data stored in the integrated circuit being encrypted using the cryptographic key in the register. The magnetically-stored bits are read and used for decrypting the encrypted data.

The package and the integrated circuit device are arranged such that removal of the package for accessing the integrated circuit (e.g., removal of a sufficient amount of the package to access data in the integrated circuit) results in removal of one or more magnetic elements. When the one or more magnetic elements are removed, the magnetic state of at least one of the magnetically-responsive bits is changed. This change in a magnetically-responsive bit thus changes the cryptographic key read from the bits, such that the changed key cannot be used to decrypt data stored in the integrated circuit chip. With this approach, decryption of the data is prevented upon tampering with the package.

In another example embodiment of the present invention, the magnetically-responsive circuit includes a magnetic tunnel junction (MTJ) device implemented for storing the bits representative of the cryptographic key discussed above. Typical MTJ devices include a multilayer structure having a pair of electrode layers of a ferromagnetic material and an interposed tunnel barrier layer of insulating material. For instance, two ferromagnetic electrode layers and an insulating tunnel barrier layer located therebetween and in contact with both ferromagnetic layers can be used to implement the MTJ device. The insulating layer is sufficiently thin to allow quantum mechanical tunneling between the electrode layers.

A variety of applications would realize benefit from this approach. For instance, in a DVD arrangement, one of the above-characterized embodiments would be useful to prevent unauthorized copying of a DVD data product. In connection with manufacture of the chip, the magnetic state of the magnetically-responsive bits can be used as a key for the DVD arrangement to decrypt the data for the DVD data production. Unauthorized efforts to copy would fail because the data would remain encrypted without the chip-stored key.

FIG. 1 shows an integrated circuit arrangement 100 having an integrated circuit 104 and a package 106, according to another example embodiment of the present invention. The package 106 is arranged to inhibit access, such as by probing or visual access, to circuitry in the substrate 104, and further includes a plurality of magnetic particles 120-125. A plurality of magnetic junction transistors (MJTs) 130-135 are in the substrate 104 and arranged such that at least some of the MJTs are affected by magnetic fields from one or more of the magnetic particles 120-125. The MJTs exhibit a logical state that is a function of a magnetic field applied to the MJTs, for example, by one or more of the magnetic particles 120-125.

The integrated circuit 104 is programmed to use the logical state of at least some of the MJTs 130-135 for data encryption. First, address information for selected ones of the MJTs 130-135 is stored in an enable register 140 (e.g., a one-time programmable memory) for subsequent use as a mask for reading a key from the MJTs. Data is encrypted using the logical state of the MJTs having their address information stored in the enable register 140. For decryption, the logical state of the MJTs 130-135 is read and masked by power-up logic circuitry 150 and using the enable register 140, with the result being stored in a volatile MJT output (key) register 160. The contents of the output register 160 are then used for decrypting data. In the above and other approaches herein, circuits such as sense amplifiers, data transmission circuits and others are optionally implemented (e.g., within the integrated circuit 104) for effecting the read and storage of information from the MJTs.

If the magnetic particles 120-125 in the package 106 are altered, such as by removal of a portion of the package 106 for inspecting or probing the substrate 104, the influence of the magnetic particles on the MJTs 130-135 is accordingly altered. In turn, the logical states of at least one of the MJTs 130-135 is altered, and the masked output from the MJTs stored in the output register 160 thus changes. The changed masked output therefore no longer will work for decrypting the data stored in the integrated circuit arrangement 100, protecting the data from undesirable access.

In a more particular implementation, the size and/or strength of the magnetic particles 120-125 are selected to maximize stability of the MJTs 130-135. For example, by performing empirical tests for a particular wafer, a size and type of magnetic particle that results in stable MJTs for encryption can be identified. With this approach, packaging with magnetic particles can be implemented for encryption purposes for a variety of wafer and circuit types having different arrangements and compositions.

FIG. 2 is a flow diagram for packaging an integrated circuit and encrypting data therein, according to another example embodiment of the present invention. The following discussion regarding FIG. 2 uses the circuit arrangement 100 of FIG. 1 as a reference; however, these characterized example embodiments may be implemented in other circuits, depending upon the application. At block 210 of FIG. 2, after packaging, the integrated circuit arrangement 100 is tested to detect MJTs that exhibit a stable logical state (e.g. one or more of MJTs 130-135). In one particular implementation, identifying stable MJTs involves determining which MJTs will reliably retain the same state (logical one or logical zero) as long as the packaging material is substantially unaltered. This identification can be achieved, for example, by reading the cell state under various conditions.

In one particular example embodiment, the chip is configured during a manufacturing stage (e.g., using a conventional test fixture) to read to each of the cell states after subjecting the chip to one or more of a variety of conditions at block 210. For instance, the cell reads can be effected after repeatedly rotating the chip ninety degrees to induce a response from an externally generated field, after changing the voltage level used in powering the chip and/or the cell grids, during vibration and after varying ambient and/or chip-controlled temperature changes. For each of no more than a threshold number of MJTs that retain the same state after each such test condition, the location (address) of the MJT and its state are stored in the enable register 140., The register-stored position and location of each of these stable MJTs is then used to generate the key.

After the enable register 140 is set, data stored in the integrated circuit arrangement 100 is encrypted using the contents of the enable register 140 as a key. At block 220 of FIG. 2, the integrated circuit arrangement 100 is powered up and outputs from the MJTs are read and masked with the contents of the enable register 140 using the power up state machine 150 at block 230. The data output from the MJTs 130-135 is masked to represent the logical state of the MJTs stored in the enable register. Example masking operations vary for different applications; typically, the mask can be implemented as any one or a combination of the following arithmetic and logic functions: OR, AND, EX-OR, shift, and 2's complement function. As depicted at block 240, this masked output is stored in the MJT output register 160 and used for decrypting data stored in the integrated circuit arrangement 100. As shown in block 250 of FIG. 2, normal data-accessing tasks (application-specific to the IC arrangement 100) use the masked data, as stored in the MJT output register 160, to decrypt the data. In this manner, the MJT-based key keeps the data-accessing tasks secure.

In one implementation, an output register used for masked data read from MJTs (e.g., as discussed above) is emptied at a selected interval. For instance, the output register can be emptied during power-down and/or at a particular time interval during operation of the chip, after which the key needs to be regenerated in order to decrypt data. In one implementation, the key register is emptied during operation of the chip, and a key is regenerated using the data stored in the enable register to mask data read from the MJTs, as discussed above. With this approach, tampering with the package during operation of the chip can be detected. In another implementation, the key register is emptied when power is removed from the chip (e.g., using volatile memory for the register). During subsequent power-up of the chip, data from the MJTs is masked with the data in the enable register and the masked data is stored in the key register for use in decrypting data. With these and other approaches, a change in the package can result in the value at one of the set of stable MJTs being changed, and the corresponding data stored in the key register changes. Thus, the changed key is incapable of decrypting the data.

In another example embodiment of the present invention, the approach outlined in FIG. 2 in connection with identifying stable MJTs at block 210 is implemented as follows. First, memory cells including an MJT are formed in a chip layout at separated locations, such that tampering with a package over the chip is highly likely to be over at least some of the cells (e.g., using conventional techniques for package removal). The number of cells used is at least about four times the number needed to form a cryptographic key. The output from each of the cells (related to the state of the MJT) is coupled to a bank of sense amplifiers, which are further coupled to multiplexers adapted for forming a word of about four times the length needed for encryption of data. The cells are tested to identify selected ones of which include stable MJTs. The testing may include, for example, varying voltage, temperature and direction relative to the Earth's magnetic field of the MJTs. Cells that pass the testing (e.g., exhibit a selected degree of reliability under testing conditions) are written into an enable register with a logical "one" being stored in a corresponding location thereof to form an enable word.

Data bits of the cells passing the testing (and having a corresponding "one" stored in the enable register) are selected for use by masking the output of the MJTs with the enable word. This masked output forms a possible key that is then tested for key qualities such as randomness. Unwanted sections of the possible key are masked out by setting corresponding bits thereof in the enable register to a data "zero." The contents of the enable register are then stored in a non-volatile memory in the chip, with bits of the enable register having a data "one" being used to form an encryption key (e.g., at block 230 of FIG. 2).

In another particular application, more than 1000 MJTs are tested using an approach similar to that discussed above in order to identify stable MJTs therefrom. From a set of identified stable MJTs that could be selected for a 128-bit AES encryption key, 128 are randomly selected and their respective locations and states are stored in the enable register 140 to form the basis for the key.

In another particular application, one or more aspects of the stability testing and selection of stable MJTs discussed herein is programmed into the chip. In another particular application, one or more aspects of the stability testing and selection of stable MJTs discussed herein is performed manually, for example, during the manufacture of the chip or by an end user wanting to protect data in the chip.

As an alternative approach, one skilled in the art would recognize that any of the above embodiments (as may be applicable) can be modified using the approach(es) illustrated and described in the two U.S. Provisional Patent Applications filed on Dec. 18, 2002 and assigned Ser. Nos. 60/434,520 and 60/434,829; both entitled "Tamper Resistant Packaging And Approach" (Attorney Docket Nos. US020611 and US020612).

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention that is set forth in the following claims.

What is claimed is:

1. An integrated circuit chip arrangement comprising:
an integrated circuit chip having circuitry therein including a plurality of magnetically-responsive nodes configured to store bits;
a package having magnetic material and covering at least a portion of circuitry in the integrated circuit chip; and
a cryptographic circuit configured to store selected bits of the plurality of magnetically-responsive nodes in an enable register, the value of the bits being responsive to the magnetic material in the package,
wherein the integrated circuit chip is configured to encrypt data as a function of cryptographic key data in the enable register, to mask an output read from the magnetically-responsive nodes using data stored in the enable register and to store the masked output in an output register wherein the package and the plurality of magnetically-responsive nodes are arranged such that removing a portion of the package alters at least one bit of the plurality of magnetically-responsive nodes having a bit stored in the enable register, wherein in response to the at least one bit of the plurality of magnetically-responsive nodes being altered, the data stored in the output register is different than the data stored in the enable register.

2. The integrated circuit chip arrangement of claim 1 further comprising a sense circuit configured to encrypt data as a function of the selected bits of the plurality of magnetically-responsive nodes.

3. The integrated circuit chip arrangement of claim 1, wherein the integrated circuit chip is further configured to decrypt data as a function of the selected bits of the plurality of magnetically-responsive nodes.

4. The integrated circuit chip arrangement of claim 1, wherein the enable register is configured to mask data read from the plurality of magnetically-responsive circuit nodes with data stored in the enable register such that only bits from the magnetically-responsive circuit nodes having a corresponding bit in the enable register are stored in the output register.

5. A method for protecting data in an integrated circuit chip having magnetically-responsive nodes configured to store data as a function of a magnetic state, the method comprising:

packaging the integrated circuit chip using a packaging material having magnetic material, the magnetic material being arranged to set a magnetic state of a plurality of the magnetically-responsive nodes;

storing an address location of selected ones of the plurality of magnetically-responsive nodes in an enable register; and using an output from the plurality of magnetically-responsive nodes to decrypt data stored in the integrated circuit chip, wherein using an output from the plurality of magnetically-responsive nodes to decrypt data stored in the integrated circuit chip includes using the address information stored in the enable register to mask an output read from the plurality of magnetically-responsive nodes and storing the masked output in a key register and using the key register to decrypt data.

6. The method of claim 5, further comprising encrypting data using bits from the selected ones of the plurality of magnetically-responsive nodes having address location information stored in the enable register.

7. The method of claim 5, wherein storing an address location of selected ones of the plurality of magnetically-responsive nodes in an enable register includes: testing the plurality of magnetically-responsive nodes for stability; and selecting stable ones of the plurality of magnetically-responsive nodes and storing address information for the stable ones of the magnetically-responsive nodes in the enable register.

8. The method of claim 7, further comprising: testing stable ones of the magnetically-responsive nodes for randomness; and wherein storing address information for the stable ones of the magnetically-responsive nodes in the enable register includes storing address information for selected ones of the magnetically-responsive nodes exhibiting randomness.

9. The method of claim 8, wherein storing an address location of selected ones of the plurality of magnetically-responsive nodes in an enable register includes storing a data "one" in the enable register for each of the selected ones of the plurality of magnetically-responsive nodes and wherein storing address information for selected ones of the magnetically-responsive nodes exhibiting a selected degree of randomness includes setting a value for selected ones of the magnetically-responsive nodes not exhibiting randomness to a data "zero."

10. The method of claim 5, prior to packaging the integrated circuit chip, further comprising: selecting a characteristic of magnetic particles in a package to maximize stability of the state of the plurality of magnetically-responsive nodes; and wherein packaging the integrated circuit chip includes arranging the magnetic material in response to the selected characteristic.

11. The method of claim 10, wherein selecting a characteristic of magnetic particles includes selecting at least one of: size and strength characteristics of the magnetic particles.

12. A method for protecting data in an integrated circuit chip having magnetically-responsive nodes configured to store data as a function of a magnetic state, the method comprising:

packaging the integrated circuit chip using a packaging material having magnetic material, the magnetic material being arranged to set a magnetic state of a plurality of the magnetically-responsive nodes;

storing selected bits of the magnetically-responsive nodes in an enable register; and masking an output read from the magnetically-responsive nodes using data stored in the enable register and storing masked output in an output register;

wherein the package and the magnetically-responsive nodes are arranged such that removing a portion of the package alters at least one bit of the magnetically-responsive nodes, wherein in response to the at least one bit of the magnetically-responsive nodes being altered, the data stored in the output register is different than the data stored in the enable register.

13. The method of claim 12, wherein only bits from the magnetically-responsive circuit nodes having a corresponding bit in the enable register are stored in the output register.

14. The method of claim 12 further comprising encrypting data as a function of the selected bits of the magnetically-responsive nodes.

15. The method of claim 12 further comprising using data stored the output register for decrypting data stored in the integrated circuit chip.

16. The method of claim 12, prior to packaging the integrated circuit chip, further comprising: selecting a characteristic of magnetic particles in a package to maximize stability of the state of the plurality of magnetically-responsive nodes; and wherein packaging the integrated circuit chip includes arranging the magnetic material in response to the selected characteristic.

* * * * *